US012762221B2

(12) United States Patent
Mullican et al.

(10) Patent No.: US 12,762,221 B2
(45) Date of Patent: Oct. 13, 2026

(54) BI-DIRECTIONAL CROSS-PLATFORM LIBRARY FOR AUTOMATED REFLECTION

(71) Applicant: Magnopus, LLC, Los Angeles, CA (US)

(72) Inventors: Kevin Mullican, Los Angeles, CA (US); Sam Birley, St Albans (GB); Will Cowling, St Albans (GB); Adam Thorn, St Albans (GB)

(73) Assignee: Magnopus, LLC, Los Angeles, CA (US)

( * ) Notice: Subject to any disclaimer, the term of this patent is extended or adjusted under 35 U.S.C. 154(b) by 439 days.

(21) Appl. No.: 17/954,723

(22) Filed: Sep. 28, 2022

(65) Prior Publication Data

US 2023/0099431 A1 Mar. 30, 2023

Related U.S. Application Data

(60) Provisional application No. 63/250,159, filed on Sep. 29, 2021.

(51) Int. Cl.

| | |
|---|---|
| ***G06F 21/45*** | (2013.01) |
| ***G06F 8/30*** | (2018.01) |
| ***G06F 8/40*** | (2018.01) |
| ***G06F 21/62*** | (2013.01) |

(52) U.S. Cl.

CPC ................ *G06F 21/45* (2013.01); *G06F 8/30* (2013.01); *G06F 8/40* (2013.01); *G06F 21/6218* (2013.01)

(58) Field of Classification Search

CPC .......... G06F 8/40; G06F 8/30; G06F 21/6218; G06F 21/45

See application file for complete search history.

(56) References Cited

U.S. PATENT DOCUMENTS

| | | | | |
|---|---|---|---|---|
| 9,189,211 | B1 * | 11/2015 | Nicholson | G06F 8/51 |
| 10,708,358 | B1 * | 7/2020 | Diasti | G06F 40/106 |
| 2003/0208743 | A1 * | 11/2003 | Chong | G06F 8/30 717/106 |
| 2004/0064826 | A1 * | 4/2004 | Lim | G06F 9/465 715/255 |
| 2007/0039010 | A1 * | 2/2007 | Gadre | G06F 9/547 719/328 |
| 2009/0248381 | A1 * | 10/2009 | Liu | G06F 11/3688 703/13 |
| 2010/0287541 | A1 * | 11/2010 | Saunders | G06F 11/3466 717/139 |

(Continued)

FOREIGN PATENT DOCUMENTS

CN 112241370 A * 1/2021 .......... G06F 11/3688

OTHER PUBLICATIONS

Postovalov, "Compilation of mathematical expressions in Kotlin" (Year: 2021).*

(Continued)

*Primary Examiner* — Phillip H Nguyen

(74) *Attorney, Agent, or Firm* — Jo Carothers; Weintraub Tobin

(57) ABSTRACT

The present disclosure relates to augmented reality, virtual reality, mixed reality, and extended reality systems, and more specifically, to systems and methods for connecting users on disparate platforms within the same virtual space while maintaining a consistent experience.

16 Claims, 6 Drawing Sheets

(56) References Cited

U.S. PATENT DOCUMENTS

| | | | | |
|---|---|---|---|---|
| 2011/0041141 | A1* | 2/2011 | Harm | G06F 9/541 719/330 |
| 2016/0013989 | A1* | 1/2016 | Chouhan | G06F 9/547 709/224 |
| 2018/0063205 | A1 | 3/2018 | French | |
| 2018/0167278 | A1* | 6/2018 | Holmes | G06F 9/5072 |
| 2019/0286550 | A1* | 9/2019 | Ohata | G06F 8/41 |
| 2020/0128106 | A1 | 4/2020 | McCormack et al. | |
| 2021/0224227 | A1* | 7/2021 | Merrill | G06F 16/164 |
| 2021/0264685 | A1 | 8/2021 | Velasquez et al. | |

OTHER PUBLICATIONS

Hamidy, "Differential Fuzzing the WebAssembly" (Year: 2020).*
Nueburg, "iOS 12 Programming Fundamentals with Swift" (Year: 2018).*
Jemerov et al., "Kotlin In Action" (Year: 2017).*

* cited by examiner

BI-DIRECTIONAL CROSS-PLATFORM LIBRARY FOR AUTOMATED REFLECTION

CROSS-REFERENCE TO RELATED APPLICATIONS

This application claims priority under 35 USC Section 119(e) to U.S. Provisional Patent Application No. 63/250,126 entitled "Point of Interest System and Method for AR, VR, MR, and XR Connected Spaces" filed Sep. 29, 2021; U.S. Provisional Patent Application No. 63/250,145 entitled "Platform Agnostic Autoscaling Multiplayer Inter and Intra Server Communication Manager System and Method for AR, VR, Mixed Reality, and XR Connected Spaces" filed Sep. 29, 2021; U.S. Provisional Patent Application No. 63/250,152 entitled "Visual Anchor Based User Coordinate Space Recovery System" filed Sep. 29, 2021; and U.S. Provisional Patent Application No. 63/250,159 entitled "Bi-directional Cross-Platform Library for Automated Reflection" filed Sep. 29, 2021; all of the entire disclosures of which are incorporated herein by reference.

FIELD OF THE INVENTION

The present disclosure relates to augmented reality, virtual reality, mixed reality, and extended reality systems, and more specifically, to systems and methods for connecting users on disparate platforms within the same virtual space while maintaining a consistent experience.

BACKGROUND OF THE INVENTION

Current systems exist that make use of technologies including augmented reality ("AR"), virtual reality ("VR"), and mixed reality ("MR") which are collectively known as extended reality ("XR"), artificial intelligence ("AI"), and the fifth-generation technology standard ("5G") for broadband cellular networks.

In this context, physical reality often refers to a physical place where a person has to be there to see it and everyone present sees essentially the same thing. MR or AR are similar in that a person is in the physical place, but they differ from physical reality in that the person can see digital content mixed with the physical objects. People present in MR or AR environments can participate in shared experiences, or the content can be unique to an individual and their interests.

In contrast, VR refers to an environment where a person is remote from the physical place but feels like they are in the physical space. The person can see digital content mixed with digital copies of physical objects. The person may also be able to see shared experiences with other people, and/or see content unique to the individual. XR encompasses AR, VR, MR, and those things in between or combinations thereof.

Work in this area includes work on what has been termed the metaverse. While metaverse has multiple meanings, the term is often used more in relation to a fictional, imaginary, and/or virtual world, rather than to a physical world.

Prior work also relates to what has been termed a mirror world. The term mirror world often is used to mean a "digital twin" of the physical world so that a user can access everything in the physical world, such as when playing a 3D video game.

Prior work also includes work on what has been termed the AR Cloud. The AR Cloud concept is about a coordinate system and content delivery.

Initial work has begun on Web XR, which is a standard that will use web technologies to make immersive content available to VR, AR, and 2D devices through a web browser. It is desirable to have a system for creating connected spaces that can be compatible with a Web XR standard. Connected spaces enable a shared, coherent experience in this bridged world between users.

In augmented reality, it remains a significant challenge to place multiple three-dimensional (3D) objects accurately within a large real-world site using only identifiable natural and manmade features. Moreover, it is difficult to precisely tie a digital model of a real place to its real-world location in a way that maintains multiple object-user and user-user relations and allows freedom of movement within a large space.

While "digital twin" primarily refers to virtual replicas of physical, digital, or imaginary spaces, those digital twin spaces may feature interactions or augmentations that are not naturally visible in the real world. To achieve parity across the digital and real worlds, those augmentations need to be represented to users in reality, meaning the augmentations must be presented in both the digital and physical worlds.

For a cohesive metaverse, applications must span a variety of platforms and engines so no particular user group or developer is excluded from creating and enjoying content. These platforms can be vastly different and often do not share a common language. Furthermore, individual development across each of these platforms would be difficult. It would be difficult for functionality to remain at parity across different platforms.

It is desirable to guarantee that two applications consisting of vastly different tech stacks can have access to the same virtual space so that users on different platforms can coexist and communicate. Moreover, it is desirable to ensure consistent code across these platforms.

It is desirable to have a foundation that guarantees the consistency necessary to provide uniform behavior on diverse platforms and projects.

It is desirable to have a foundation that enables faster iteration when breaking changes are introduced in the service architecture. If a breaking change to the platform's cloud-hosted services API needs to be made, the automatic build pipeline will regenerate with the changes and fail to compile as a result. This causes the code to fail immediately with minimal investigation.

Therefore, it is desirable to create a system and method for use across XR, desktop, web, and mobile platforms for connecting digital and physical spaces that overcomes these limitations.

BRIEF SUMMARY OF THE INVENTION

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

A connected space ("connected space") is any combination and/or augmentation of one or more physical worlds and/or digital worlds, to allow one or more individuals to participate in the resulting spatial experience. Whether physically co-located or geographically dispersed, the connected space can be singularly, continually, or periodically consumed by one or more users at the same time, during overlapping times, or at different times, either synchronously or asynchronously. This invention and disclosure provide a digitization of the places and objects in the physical world that will connect the physical and digital worlds and make a connected space accessible anywhere in real-time.

This invention and disclosure can be used for a connected space that makes the same content as in the physical world accessible through AR devices by turning off the digital twin environment. The physical site can be augmented with smart layers where the matching digital content layers align with the physical world.

This invention and disclosure can be used with a "digital twin" to allow the AR cloud content to become accessible remotely, on demand in a connected space.

This invention and disclosure include a system and method that can be used for a connected space that is accessible collaboratively from personal computers, mobile phones, or immersive devices.

It is desirable to have a technology platform that allows users to design, build, and operate a connected space that bridges physical and digital spaces. A platform powers XR experiences that may be accessed by users anywhere in the world at any time. It allows multiple users to collaborate in the design and review process, such as when designing a real-world location of interest and simulated mission.

In one embodiment, a platform (the "Platform") hosts all content and logic designed to operate the connected space, enabling end-users to conduct activities (e.g., whether consumers engaging with experiences or enterprise users with operational activities) within the Platform. It also can gather data from trainee performance in missions and easily adjust elements within the missions to create additional operational scenarios. The Platform can import a "digital twin" anchored in a real-world location with geographically contextualized data. The Magnopus World Services Platform is one embodiment of an example Platform.

In one example embodiment, the Platform allows visualization of assets and mission components as trainers design operational challenges for trainees.

In another example, physical and digital visitors can be connected in a world filled with AI characters, AR experience activations (e.g., AR art activations), character interactions, experiences, and/or entertaining quests of discovery. A digital twin can be connected to the physical site such that the digital twin is accessible from around the world in VR and through devices such as mobile and desktops. The physical site can be a smart environment with an AR interface and mobile apps that respond to a visitor's presence. The AR and social capabilities can connect to the IoT infrastructure of the physical site. In one example, this is built on a 5G infrastructure. In one example, humans, avatars, and AI characters can interact. The people, characters, and even objects can interact. Interaction is non-linear, mirroring the real world. For remote visitors, PC or mobile applications, including VR, grant access to the connected space where the remote visitors can connect with the physical content and on-site visitors. Data streams, video, and audio connect visitors in the physical world with those attending virtually.

The Platform provides cross-device flexibility, allowing access to the same connected space across multiple devices, including VR, AR, desktop, mobile (2D and AR), and web. All updates to the core connected space are automatically updated for all devices.

The Platform allows real-time social and multiplayer interaction. Users can interact intuitively with other users with highly naturalistic social mechanics. It utilizes multiplayer technology that governs seamless interactions between users. The massively multiplayer online ("MMO") engine enables the scaling up of users within the Platform and driving multiplayer interactions.

The Platform handles dynamic content, allowing the import and export of environments and assets across multiple standard 3D and 2D file types while scenarios are running.

The Platform provides customizable experiences by defining rules that power events, activities, and exercises that govern a connected space.

The Platform provides data analytics that track user activities and experiences across the connected space. It gathers aggregate data in a dashboard to analyze user activities.

Geographically contextualized data is incorporated by the Visual Positioning System ("VPS"). Content and experiences in connected spaces are mapped to real-world locations with high accuracy, such as centimeter-level precision. The system streams in relevant data feeds like IoT devices or other equipment and sensors to create additional contextually relevant experiences within the connected space. The Point-of-Interest ("POI") tool allows the Platform to place content and experiences within a "map" of the digital twin. The VPS allows for geographic contextualization.

The foundation provides the capabilities for the Platform to be game engine agnostic. In one embodiment, Unity and Unreal plugins allow developers to use either engine and still collaborate with users in the other supported platforms and interfaces. This device-agnostic approach accommodates collaboration across different projects, teams, and partner workflows in the same platform.

In one example, the system architecture includes a 5G network and Edge network across the site, a high density of Wi-Fi access points, PoP connections to cloud services, an on-premises high-performance data center, visitor positioning systems, mobile to IoT systems integration, site-wide integrated digital signage and audio, digital twin and avatar systems, gamification systems, content systems bridging AR and VR users, large scale MMO cross-platform communication, and a behavioral logic system for visitor experience The purpose of the foundation is to provide a system and method for consistent and quick iteration in applications that may have vastly different tech stacks across desktop, mobile, web, and console. This purpose is particularly important in connecting users on disparate platforms within the same virtual space while maintaining a consistent experience. This interface functions as a contract between client applications on various engines and platforms that guarantees that two unique clients from different tech stacks can coexist in a single virtual environment. For example, users running mobile clients can occupy the same virtual space as those on a desktop.

To support common, unified functionality across multiple platforms and modalities, a collection of abstract interfaces is implemented. This functionality is encapsulated in the foundation.

This is achieved through a library, such as a C++ library, with bidirectional wrappers that provide bindings with other languages used by alternate platforms. These wrappers ensure the safe transfer of data between the client and service while maintaining communication with cloud-hosted services.

A novel data architecture that allows us to aggregate changes being submitted from clients to reduce the throughput of data is disclosed.

The data architecture manifests as an entity-component-system, which is serialized and sent via the SignalR protocol. The entity-component system abstraction allows developers adopting the foundation to reason about entities, their components, and the properties of each component, whilst the foundation handles the transmission of data, including rate limiting features. There are two main rate limiting features that leverage this architecture.

The first feature, message merging, enables a predictable worst-case level of outgoing throughput for any given entity at the client level. If and when a property is changed by a client, the foundation first defers the transmission of any changes until the next frame. In that time, other changes may also come in that modify the same value. Then on the next frame, the foundation merges any deferred changes into a single message, which is then sent. In doing so, the number of outgoing client transmissions per-entity is reduced to at most one per frame, regardless of the number of changes the client application has made to the entity and its components.

The second feature, component patch messaging, allows the Platform to reduce the amount of sent and received data per-entity. Rather than transmitting the entire entity, a patch message is sent by the foundation that only contains the component delta; meaning only the components that have actually been modified. This patch message is received by the backend services and retransmitted to other connected clients who already have an awareness that the entity exists. In doing so, redundant data transmission is avoided at both send and receive time, and therefore overall bandwidth is reduced.

The foundation also guarantees a high level of interoperability and compatibility between different client applications built by different organizations or teams.

A typical problem encountered when multiple organizations or teams attempt to build separate software is each organization typically defines and targets its own data schemas. This introduces a high level of friction for other organizations seeking to develop interoperable applications, as all schemas must then be parsed and the parser must be maintained as the schemas change.

The foundation solves this by handling all data transmission and schema encoding within the library in an opaque fashion. The client application developer is instead presented with a strongly typed API that allows developers to reason about platform concepts, rather than transmission details.

As an example, a client application developer reasons about an API that speaks in terms of blocking other users from communicating with the local user, but they need not reason about how, or where in the data architecture, the set of blocked users is stored. This is instead implemented for the developer within the foundation.

Another client application developer building software against the foundation can then confidently retrieve the set of blocked users from the API foregoing any knowledge of the underlying schema or implementation details and still be certain that their implementation of the feature is guaranteed to receive the same set of blocked users that the former application defined.

By making this level of implementation detail opaque to the client application developer, and offering an API that reasons in terms of concepts, this leads to the second benefit of API homogeneity. The notion that a feature can be implemented once in the foundation, exposed in a client-application-agnostic fashion, and all client applications automatically benefit from the feature. When coupled with a wrapper generator mechanism, this also then holds true for any client application built on top of the foundation that uses a language that the foundation supports.

The foundation API also enables client application developers to build multi-user experiences constructed from user-generated content. It also affords interactivity within the environment by supporting user-authored scripts. There are two main novel features of the foundation scripting implementation, interoperability and distributed execution.

The foundation enables developers to build applications that allow their users to write scripted behavior that all clients can respond to, while also guaranteeing interoperability between different applications.

The foundation achieves interoperability by providing a highly terse API that enables client applications to simply submit Javascript source to the foundation, and from that point onwards, the rest of the scripting implementation is kept opaque to the application.

Internally, the foundation handles the distribution of the script to other client applications, identifying an executor for that script, having the executor execute it locally using a Javascript interpreter running internally within the foundation, and replicating any changes that result in the execution to other clients.

In doing so, the foundation enables any client application that uses the library to be a potential executor of a script, without requiring the client application to implement any level of script-related integration.

A key and common problem in multi-user real-time applications is the handling of the computation required for dynamic, scripted, interactive behavior whose results manifest to all connected users in the same way. All users need to see the same results, at the same time, based on some user-related action in the environment.

This becomes more problematic when the interactive behavior is defined by users themselves, as the level of compute required effectively becomes bounded by what the user-generates and adds to the environment. It can scale in a fashion that the developer cannot easily control.

The foundation handles this by spreading script execution responsibility between client applications (a form of load balancing) while ensuring that only one client at any given time is responsible for executing a particular script.

Interoperability is a core tenet of the foundation. However, this does not mean that all clients must always see the exact same content at the exact same place and time. Depending on the characteristics of the client application and the hardware that it is run on, interoperability also means that the client application can degrade the view of the environment in a graceful manner.

Certain applications built with the foundation may require bespoke functionality and affordances to their users; concepts that are not readily shared with other client applications. One client application for example may seek to build a shared experience with a mixture of content and interactivity unique to that application, as well as a collection of content that other client applications should also be capable of rendering.

The foundation affords users the ability to define components at the application that can belong to an entity via a "custom component" type defined at the API level. The custom component requires the client application identify itself so that other client applications may understand the origin of the data type along with a key or value style collection of properties that belong to the component. The data is then serialized in the same fashion as any other component and automatically transmitted by the foundation to the backend for distribution to other client applications.

Accordingly, one or more embodiments of the present invention overcomes one or more of the shortcomings of the known prior art.

For example, in one embodiment, a method for converting an application programming interface (API) request into an underlying web request for a cloud hosted service is disclosed comprising: receiving a login request from a client, wherein the login request comprises a login credential for the client; providing the login credential to a cloud hosted service; authenticating the login credential by the cloud hosted service; returning a success or failure notification to the client; and maintaining the authenticated login credentials for the duration of a session.

In this embodiment, the method can further comprise: uploading and downloading one or more digital assets from the client during the session; or wherein uploading and downloading the one or more digital assets is in one or more smaller upload increments.

In another example embodiment, a method for converting between a plurality of code types wherein there is a mismatch between one or more of the plurality of code types comprising: triggering a reflection of a current set of application programming interfaces (APIs); scanning through a plurality of endpoints of cloud-hosted services and data transfer objects; creating matching code to provide all compile types at runtime; and communicating with the cloud-hosted services.

In this embodiment, the method can further comprise: wherein converting between a plurality of code types provides platform independent interoperability; wherein the reflection is a C++ reflection; wherein the matching code is C++ code; wherein the reflection is a C# reflection; wherein the matching code is C# code; wherein the reflection is a WebAssembly reflection; wherein the matching code is WebAssenbly code; wherein the reflection is a python reflection; wherein the matching code is python code; wherein the reflection is a Swift reflection; wherein the matching code is Swift code; wherein the reflection is a Kotlin reflection; wherein the matching code is Kotlin code; wherein the reflection is a Java reflection; or wherein the matching code is Java code.

In another example embodiment, a platform for a connected space is disclosed comprising: a point-of-interest system; a massively multiplayer online service; a visual positioning system; and a foundation comprising: an asset system for interfacing with an object prototype service, wherein the object prototype service provides object prototype and world object instantiation functionality; a user service and a space system for interfacing with a user management service, wherein the user management service implements support for stateful user information; a multiplayer system for interfacing with one or more multiplayer services wherein the one or more multiplayer services maintains the real-time state of users and objects by a geographic region and broadcasts location and state changes to one or more users and one or more objects in the geographic region; and a point of interest system and an anchor system for interfacing with a spatial data service, wherein the spatial data service comprises a plurality of cloud anchors for visual positioning and point of interest data.

In this embodiment, the platform can further comprise wherein the connected space comprises a virtual reality connected space; wherein the connected space comprises an augmented reality connected space; wherein the connected space comprises a mixed reality connected space; or wherein the connected space comprises an extended reality connected space.

In another example embodiment, a method for aggregating and regulating the frequency and size of messages between a plurality of client applications and a plurality connected services is disclosed comprising reducing overall bandwidth consumption while providing low latency interactions between a plurality of clients.

In another example embodiment, a foundation for converting an application programming interface request into an underlying web request for one or more cloud-hosted services is disclosed comprising: an asset system for interfacing with an object prototype service, wherein the object prototype service provides object prototype and world object instantiation functionality; a user service and a space system for interfacing with a user management service, wherein the user management service implements support for stateful user information; a multiplayer system for interfacing with one or more multiplayer services wherein the one or more multiplayer services maintains the real-time state of users and objects by a geographic region and broadcasts location and state changes to one or more users and one or more objects in the geographic region; and a point of interest system and an anchor system for interfacing with a spatial data service, wherein the spatial data service comprises a plurality of cloud anchors for visual positioning and point of interest data.

In this embodiment, the platform can further comprise: wherein the anchor system comprises a plurality of anchors; or wherein the user services system comprises an authentication, a profile, and one or more user roles.

Other objects, features, and advantages of the present invention will become apparent upon consideration of the following detailed description and the accompanying drawings.

DETAILED DESCRIPTION OF THE INVENTION

The following is a detailed description of embodiments to illustrate the principles of the invention. The embodiments are provided to illustrate aspects of the invention, but the invention is not limited to any embodiment. The scope of the invention encompasses numerous alternatives, modifications, and equivalents. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes and are not intended to limit the scope of the claims.

The disclosed invention is used to create a connected space. A connected space ("connected space") is any combination and/or augmentation of one or more physical worlds and/or digital worlds, to allow one or more individuals to participate in the resulting spatial experience. Whether physically co-located or geographically dispersed, the connected space can be singularly, continually, or periodically consumed by one or more users at the same time, during overlapping times, or at different times, either synchronously or asynchronously. This invention and disclosure provide a digitization of the places and objects in the physical world that will connect the physical and digital worlds and make a connected space accessible anywhere in real-time. Connected spaces are accessible collaboratively from personal computers, mobile phones, immersive devices, or other similar devices.

Platform 100 Overview

Figure 1:
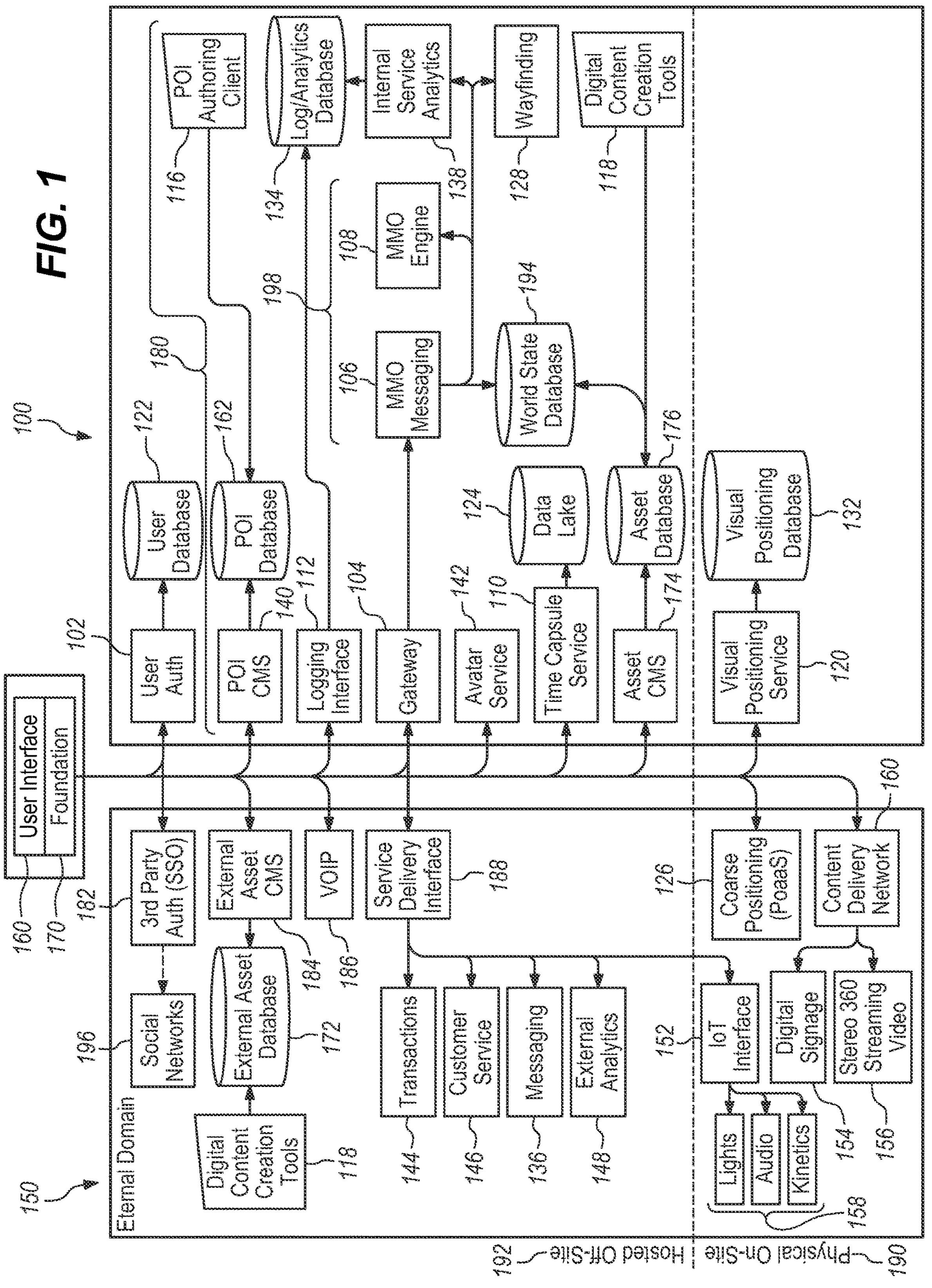
FIG. 1 illustrates an embodiment of a platform for coherently managing real-time user interactions between the virtual and physical items, character bots, and other human participants, whether in VR, AR, MR, or XR.

As shown in FIG. 1, Platform 100 according to the present invention is a technology platform that allows users to design, build, and operate a connected space that bridges physical and digital spaces. It powers XR experiences to be accessed by users anywhere in the world at any time. It allows multiple users to collaborate in the design and review process, such as when designing a real-world location of interest and simulated mission. Platform 100 can import a "digital twin" anchored in a real-world location with geo-contextualized data.

Platform 100 comprises a user authentication service 102, gateway 104, massively multiplayer online ("MMO") messaging 106, MMO engine 108, time capsule service 110, logging interface 112, Point-Of-Interest ("POI") system 180, avatar service 142, and Visual Position System ("VPS") 120. The Magnopus World Services Platform is an example of Platform 100. MMO services 198 comprises MMO engine 108 and MMO messaging 106. Internal analytics can be done by internal service analytics 138 using log analytics database 134.

In one example embodiment, Platform 100 allows visualization of assets and mission components as trainers design operational challenges for trainees. Platform 100 can publish and make available to operate the connected space, enabling end users to conduct activities (e.g., whether consumers engaging with experiences or enterprise users with operational activities) within Platform 100. It also can gather data from trainee performance in missions and easily adjust elements within the missions to create additional operational scenarios.

In another example, physical and digital visitors can be connected in a world filled with AI characters, AR experience activations (e.g., AR art activations), character interactions, experiences, and/or entertaining quests of discovery. A digital twin can be connected to the physical site such that the digital twin is accessible from around the world in VR and through devices such as desktops.

External services 150 are either located at physical on-site 190, which is the physical site of the visitors, or located at hosted offsite 192, such as a cloud environment. IoT infrastructure 158, coarse positioning 126, and digital signage 154 and audio/video streaming 156 are located at the physical on-site 190. In one embodiment, third party authentication service 182, external asset CMS 184, VOIP 186, and service delivery interface 188 are located at hosted offsite 192. In one embodiment, third party authentication service 182 is used to authenticate social networks 196. In another embodiment, service delivery interface 188 can be used for interaction with external services 150 such as transactions 144, messaging 136, customer service 146, and/or external analytics 148.

In one embodiment, external services 150 can be a smart environment that responds to visitors through user interface 160, which in various embodiments can comprise an AR and/or VR interface, mobile apps, web applications, desktops, kiosks, and other devices that respond to visitors.

The AR and social capabilities can connect to the IoT infrastructure 158 via IoT Interface 152 of external services 150. In one example, this is built on a 5G infrastructure. In one example, humans, avatars, and AI characters can interact. The people, characters, and even objects can interact. Interaction is non-linear, mirroring the real world. For remote visitors, PC or mobile applications, including VR, grant access to the connected space where the remote visitors can connect with the physical content and on-site visitors. VOIP 186 and content delivery network 160 can connect visitors in the physical world with those attending virtually via digital signage 154 and audio/video streaming 156.

Platform 100 provides cross-device flexibility, allowing access to the same connected space across multiple devices, including VR, desktop, mobile (2D and AR), and web. All updates to the core connected space are automatically updated for all devices.

Platform 100 allows real-time social and multiplayer interaction. Users can interact intuitively with other users with highly-naturalistic social mechanics.

Platform 100 implements the functionality necessary to create a digital twin of a physical location.

Platform 100 populates the location with digital elements including architectural geometry, virtual items, and automated characters via world state database 194 and avatar service 142. Platform 100 coherently manages real-time user interactions between the virtual and physical items, character bots, and other human participants, whether in VR, AR, MR, or XR. FIG. 1 details the relationship of these components in an example embodiment.

The user authentication service ("UAS") 102, user data base 122, and third-party authentication service 182 provides support for multi-tiered access to the services for a connected space and abstracts and extends the functionality of any underlying, full-featured User Access Management ("UAM") system. In addition to full user authentication and authorization, UAS 102 also allows anonymous and stateful, non-personally identifiable information ("PIT") user access from user database 122. UAS 102 is responsible for granting tokens and managing access to the appropriate backend services for each tier of user. UAS 102 is able to automatically migrate user accounts from anonymous and non-PII accounts to full UAM accounts without additional user intervention.

Gateway 104 enables a transparent connection between user application requests and the appropriate backend services. Gateway 104 is responsible for automatically provisioning and deploying new services, scaling existing services, and removing unused services based on user demand. Through, for example, a uniform RESTful API, Gateway 104 implements reverse proxy, port redirection, load balancing, and elastic scaling functions. Gateway 104 provides a simple, deterministic interface for user access and resource management, masking the underlying complexity of the service architecture.

MMO messaging 106 is the robust data routing and communication layer for the broader set of services that are a collection of loosely coupled microservices. The microservice architecture provides several key advantages over a monolithic solution including ease of maintenance, extensibility, continuous deployability, abstraction of complexity, and scalability. However, in order to gain the advantages of a microservice solution, MMO messaging 106 implements a standalone, scalable message passing interface with a strictly defined, but abstract and simple, protocol for defining message sources, destinations, types, and payloads. MMO Messaging 106 can rapidly inspect message metadata and ensure all messages are delivered to the intended recipients. MMO messaging 106 is the nervous system of Platform 100.

MMO engine 108 is a collection of loosely coupled microservices 232 (FIG. 2) that enable a massive persistent, shared world space for arbitrary numbers of simultaneous and asynchronous users. MMO engine 108 utilizes multiplayer technology that governs seamless interactions between users. MMO engine 108 enables scaling up of users within Platform 100 and driving multiplayer interactions.

Figure 2:
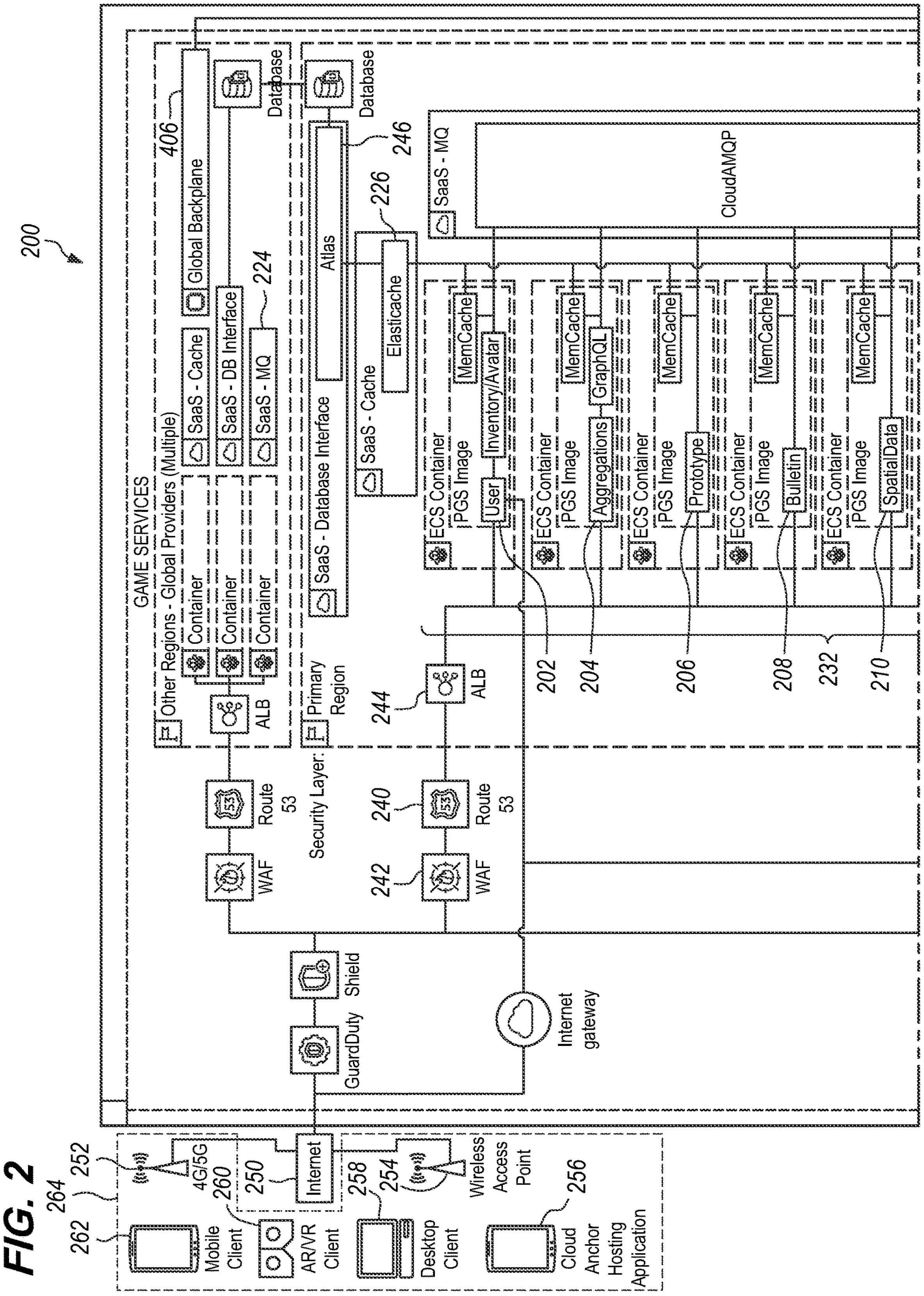
FIG. 2 shows an embodiment of a cloud hosted services system overview diagram.
Figure 2:
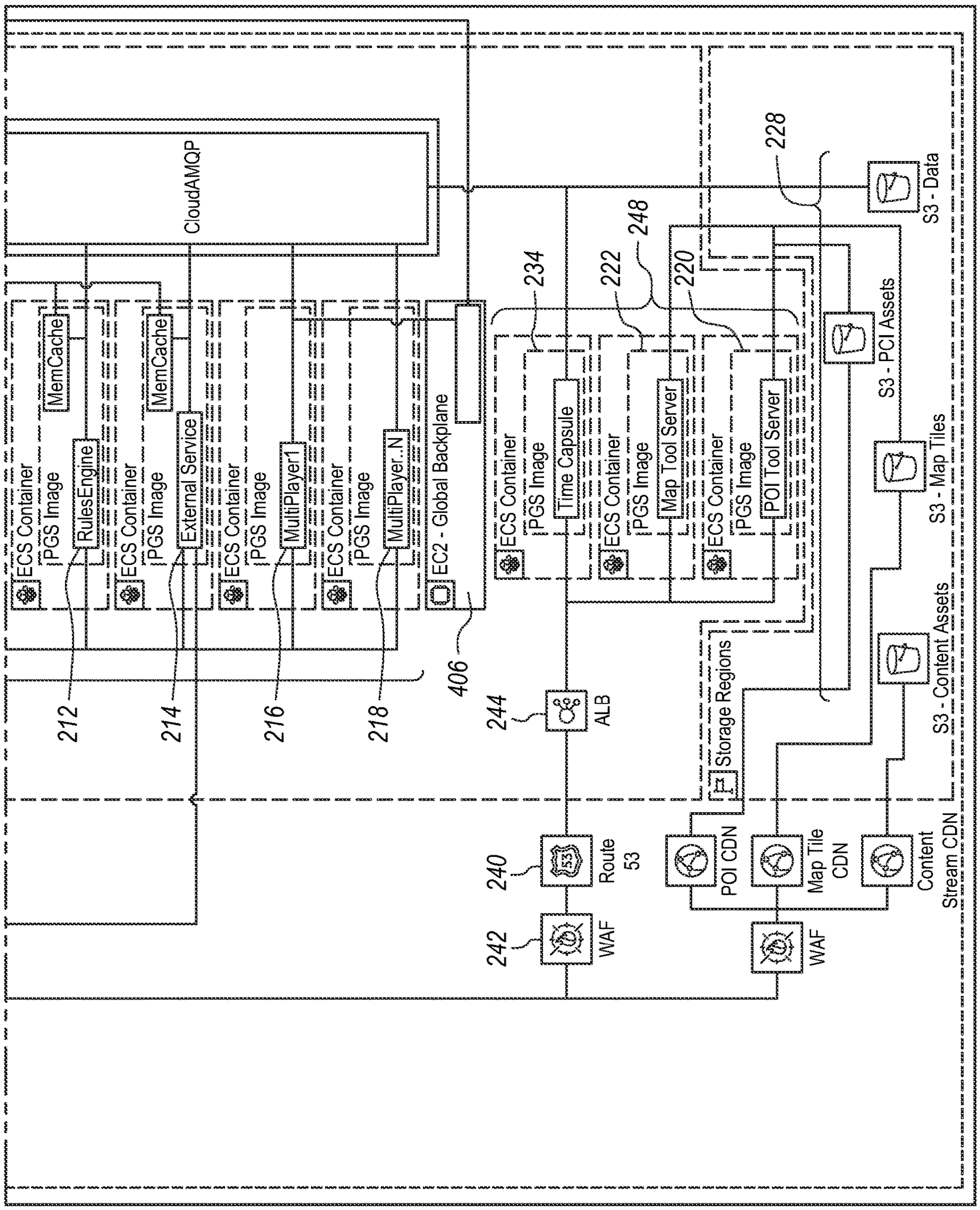

MMO engine 108 is extensible in order to support future requirements. MMO engine 108 comprises several core components including in one example embodiment as shown in FIG. 2 object prototype services 206, user management services 202, multiplayer services 216 and/or 218, and spatial data services 210. User management services 202 implements support for stateful user information such as inventory and history. Object prototype services 206 provides abstract, non-user object prototype and world object instantiation functionality. Multiplayer services 216 and/or 218 maintains the real-time state of users and objects by geographic region, and broadcasts location and state changes to all other users and objects in the region.

Through the collection of microservices 232, though users may enter and exit the world at will, the overall state of the world remains synchronous and persistent. In addition, client applications are able to request classes of world elements relevant to their function. For example, virtual reality applications would request all geometry in the world, but augmented reality applications would only need user and transient object geometry. MMO engine 108 provides the core components for maintaining a common, interactive world to all users.

Time capsules are a unique method of allowing participants to take away a tangible memento of their time in a connected space that is experienced in VR, AR, MR, or XR. Time capsules are graphical timelines of the users' journeys through the connected space, complete with personal pictures and text of the experience. The time capsule service 110 facilitates this by capturing, contextualizing, and storing the artifacts of an attendee's journey in data lake 124. Once the user leaves the connected space, the service generates a visual summary and presents it to the user so that they can continue to access and relive their journey.

Platform 100 further comprises POI authoring client 116 and digital content creation tools 118. The digital world is only engaging if it is populated with content. The world content is divided into two primary classes: Points of Interest and World Data. The system includes POI authoring client 116 and digital content creation tools 118 for creating each class of content.

In an example embodiment, the world space is stocked with real world points of interest, from artwork to architecturally significant structures, and from historically significant artifacts to culturally significant elements. POI authoring client 116 provides the interface to define these elements and their associated metadata. POI authoring client 116 is also a graphical map interface with user experience elements such as a button, check box, text box, or similar for adding, modifying, and deleting points of interest and individual metadata fields. The POI authoring client 116 manages the definition of locations for existing, network accessible metadata as well as the uploading of content to the POI database 162.

For world items that are not authored in the POI authoring client 116, the digital content creation tools 118 provides the interface for defining them. These items include items such as building geometry, landscape components, architectural detail, civil structures, digital signage, and site decoration. Digital content creation tools 118 allows authors to associate assets in asset store database 176 and external asset store database 172 with their positions in digital world space. The client also manages the uploading of digital assets to the asset store database 176 and external asset store database 172. The client includes a fully immersive interface for interacting with the total world space, such as in VR.

User interface 160 is the user-facing element of Platform 100, and it is the portal through which users interact with the world and other users. Through various presentation models including VR and AR on multiple devices such as mobile, desktop, and wired and standalone HMDs, users employ natural interactions using familiar interfaces such as 6 Degrees of Freedom ("DOF") controllers and thumbsticks. Since user interface 160 is the way general users experience this world, the usability and enjoyability of them is critical. User interface 160 is built on top of foundation 170, and communicating in real time and retrieving the world elements on demand from MMO engine 108 to aid in creating a seamless experience.

Platform 100 is an architecture that can support an extremely large and complex environment. Given that there is a finite capability in the devices running the end user applications, a world with infinite complexity would not be possible to represent. The client applications include renderer functions that work in conjunction with the backend services and visualization capabilities to present a convincing immersive experience for the user with the essential and relevant data and representations for that user.

Foundation 170 abstracts and unifies all the functionality necessary to provide a seamless, networked immersive user experience. It includes a developer interface to build the user experiences and the libraries to deploy the experiences to the user-facing applications. It coordinates the communication between the abstract backend world representation and the in-experience user-facing environment. Foundation 170 is the bridge between the world state and the human computer interface.

To provide a believable and effective augmented reality for users to collaborate within, concrete anchors to the absolute physical world coordinate space are used. Users must be able to see the same things in the same place at the same time, and experience the results of interactions as they occur. VPS 120 abstracts the generalized functionality and in an example embodiment, interfaces with third party systems. In addition, as systems evolve, and new approaches emerge, they can be easily integrated without need to rebuild the abstract interface.

Geo-contextualized data stored in VPS database 132 is incorporated by VPS 120. Content and experiences in connected spaces are mapped to real-world locations with high accuracy, such as centimeter-level accuracy. VPS 120 streams in relevant data feeds like IoT devices or other equipment and sensors to create additional contextually relevant experiences within the connected space.

POI system 180 comprises POI CMS 140, POI Authoring Client 116, and POI database 162 and allows Platform 100 to place content and experiences within a "map" of the digital twin. Storing temporal information for objects improves network bandwidth and reduces the required resources because, unlike GIS systems, an object is only displayed when the time is correct. For example, sunset is not displayed midday and should not look exactly the same every day, and fireworks can be reserved for holidays and can vary across years and/or locations.

Foundation 170 provides the capabilities for Platform 100 to be game-engine agnostic. In an example embodiment, Unity and Unreal plugins allow developers to use either engine and still collaborate with users in the other engine. This device-agnostic approach accommodates collaboration across different projects, teams, and partner workflows into the same platform.

In one example embodiment, the system architecture includes a 5G network and Wi-Fi access points to PoP connections via service delivery interface 188 and gateway 104 to hosted off-site services 192; visitor positioning via VPS 120, course positioning 126, and wayfinding 128; mobile to IoT systems integration via IoT interface 152; site-wide integrated display via VOW 186 and content delivery network 160 comprising digital signage 154 and audio/video streaming 156; digital twin capability via world state database 194 and avatar service 142; external asset CMS 184, external asset database 172, POI CMS 140, POI database 162, asset CMS 174, and asset database 176 for bridging AR and VR users; large scale cross-platform communication via gateway 104 and user interface 160; and MMO engine 108 for visitor experience.

Cloud Hosted Services System 200

FIG. 2 shows cloud hosted services ("CHS") system 200. In one embodiment, CHS system 200 is hosted on Amazon Web Services, but in other embodiments, may be adapted to most modern cloud service providers. CHS system 200 comprises multiple, loosely coupled microservices 232.

In one embodiment, these microservices 232 comprise user management services 202, service aggregations 204, object prototype services 206, notification bulletin 208, spatial data services 210, rules engine 212, external service 214, and multiplayer services 216 and 218. In one embodiment, the spatial data services 210 comprises cloud anchors for visual positioning and POI data. Microservices 232 are containerized and scalability is managed through a container service, such as in one example embodiment the AWS Elastic Container Service ("ECS").

Also hosted within CHS system 200 are management and operational tools 248 comprising a POI tool service 220, user tracking map tool service 222, and time capsule tool service 234.

In one embodiment, for efficient internal communication, CHS system 200 relies on SaaS solutions, such as in one embodiment RabbitMQ 224 for non-real-time services and a global cluster 226 for real-time, low latency services. Persistent data is stored in data storage components 228. Caching is facilitated through global cluster 226, such as a Redis cluster. Management and operational tools 248 are also containerized and scalability is managed through a container service, such as in one example embodiment the AWS ECS.

Load balancers 244, WAF 242 and resolvers 240 route traffic to microservices 232 and management and operational tools 248 based on a real-time load of microservices 232 and management and operational tools 248.

In one example embodiment, the load on each of the microservices 232 is measured, and if the load is high enough, then another instance of the specific microservice 232, such as user management services 202, is started and load is balanced across all instances. Messages are forwarded through global backplane 406, which is connected to multiplayer services 216 and/or 218.

Microservices 232 interface with database 246, such as a MongoDB Atlas in one embodiment, and management and operational tools 248 with data storage components 228 for record management and data references. User-facing data is stored in data storage components 228 separately from system logic. This allows for more efficient storage and delivery of data through a content delivery network while maintaining the flexibility of a referential, decoupled logic layer. Data can be updated and versioned independently of the referring logic.

Service REST and Web Socket interfaces are available to Internet-connected clients through load balancer 244. Non-real-time services support stateless REST interfaces for user management services 202, service aggregations 204, object prototype services 206, spatial data service 210, rules engine 212, and external service 214. Real-time, low latency services support stateful Web Socket and SignalR interfaces for notification bulletin 208 and multiplayer services 216 and 218.

External clients 264 may include mobile 262, web desktop 258, AR/VR/MR/XR 260, and cloud anchor hosting applications 256. The only requirement for using CHS system 200 is an Internet connection 250, which can be through wired, wireless 254, or mobile 4G/5G/nG networks 252.

In various embodiments, CHS system 200 may be deployed in any of a shared tenancy, dedicated, or on-premises model. CHS system 200 may also be directly connected to external sites and networks, such as in one embodiment through AWS Direct Connect. CHS system 200 may also optionally be integrated with external SaaS solutions, such as Google Cloud Anchors or Google Firebase.

Foundation 170

Figure 3:
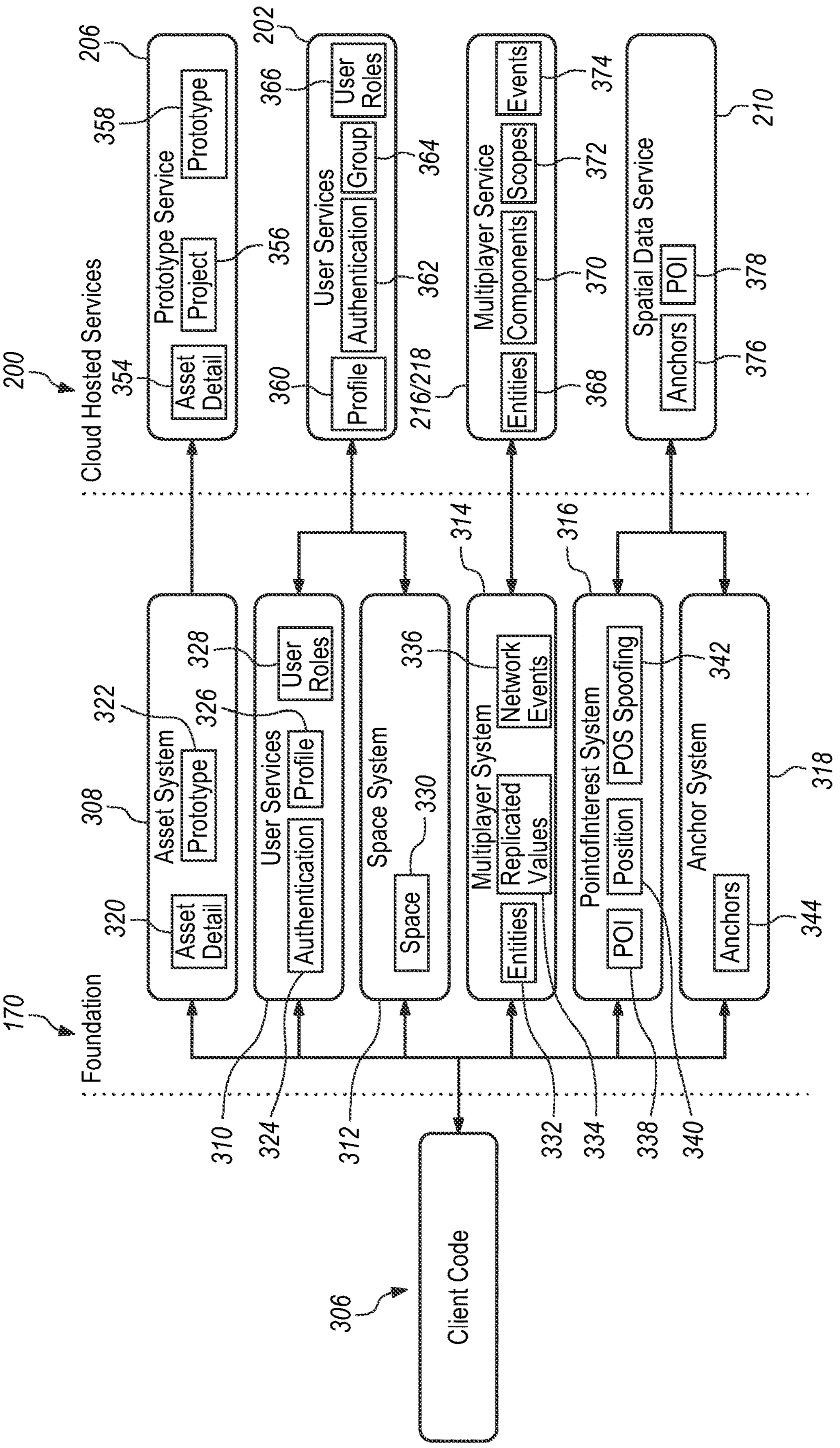
FIG. 3 shows an embodiment of a block diagram for the foundation.

Turning to FIG. 3, foundation 170 comprises a cross-platform library, such as a C++ library, that allows quick implementation of high-level functionality of microservices 232 inside CHS system 200 while guaranteeing consistent functionality across several different clients. In one example embodiment, C++ is used for foundation 170 for performance and because C++ bindings are more accessible than other languages. While the library itself is in C++, different platforms require different bi-directional wrappers to handle the translation from C++ to the target language and vice versa.

As shown in FIG. 3, foundation 170 wraps various microservices 232 into a simple interface with higher-level client code 306, such as Unity and/or Unreal in one embodiment, across Platform 100.

Clients interact with foundation 170 through separate systems. For a given specific set of cloud-hosted microservices 232, such as in one example embodiment as shown in FIG. 3, object prototype services 206, user management services 202, multiplayer services 216 and/or 218, and spatial data services 210, foundation 170 contains individual systems for particular sets of functionality, such as asset system 308, user services 310, space system 312, multiplayer system 314, point of interest system 316, and anchor system 318.

For example, there may be an Application Programming Interface ("API") for accessing, downloading, and creating assets, or an API for logging on and tracking user accounts. These functions are precompiled as developers do not have access to the source code.

The systems in foundation 170, such as asset system 308, user services 310, space system 312, multiplayer system 314, point of interest system 316, and anchor system 318, convert API requests into underlying web requests for the appropriate cloud-hosted micro-services 232. This may require an aggregation or disambiguation of those services, often with multiple calls requiring data translations between them. Moments later, responses from the appropriate cloud-hosted micro-services 232 are processed in reverse and communicated back through foundation 170 to the requesting clients through client code 306.

Figure 5:
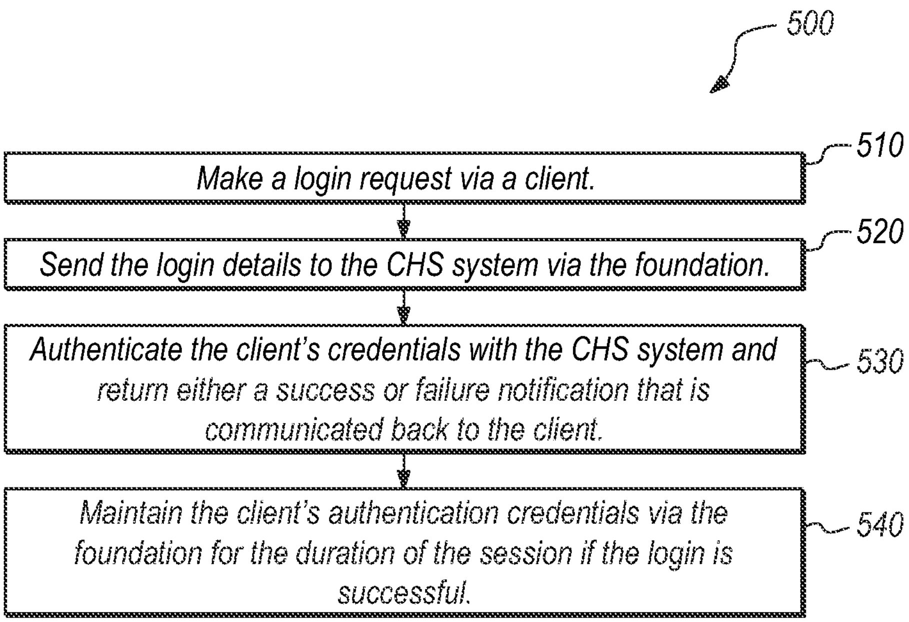
FIG. 5 illustrates an embodiment of an authentication process when a client makes a login request.

For example, FIG. 5 illustrates authentication process 500 when a client makes a login request. First, at step 510, the client makes the login request with the client's login credentials. At step 520, foundation 170 passes the client's login credentials to CHS system 200. At step 530, CHS system 200 authenticates the client's login credentials and returns either a success or failure notification that is communicated back to the client. At step 540, foundation 170 maintains the client's authentication credentials for the duration of the session if the login is successful.

Additionally, complex processes like asset uploads may take place in several smaller increments though foundation 170 after authentication and while foundation 170 maintains the client's authentication credentials. First, a user requests an asset, then an assetID is returned, and the assetID is sent again to enable the upload.

Turning back to FIG. 3, in one embodiment foundation 170 comprises asset system 308, user services 310, space system 312, multiplayer system 314, point of interest system 316, and anchor system 318. Asset system 308 comprises asset detail 320 and prototype 322. User service 310 comprises authentication 324, profile 326, and user roles 328. Space system 312 comprises space 330. Multiplayer system 314 comprises entities 332, replicated values 334, and network events 336. Point of interest system 316 comprises POI 338, position 340, and POS spoofing 342. Anchor system 318 comprises anchors 344.

In one example embodiment, CHS system 200 comprises object prototype services 206, user management services 202, multiplayer services 216 and/or 218, and spatial data services 210. Object prototype services 206 comprises cloud asset detail 354, cloud project 356, and cloud prototype 358. User management services 202 comprises cloud profile 360, cloud authentication 362, cloud group 364, and cloud user roles 366. Multiplayer services 216 and/or 218 comprises cloud entities 368, cloud components 370, cloud scopes 372, and cloud events 374. Spatial data services 210 comprises cloud anchors 376 and POI data 378.

As shown in FIG. 3, in this embodiment, asset system 308 interfaces with object prototype services 206. User service 310 and space system 312 interfaces with user management services 202. Multiplayer system 314 interfaces with multiplayer services 216 and/or 218. Point of interest system 316 and anchor system 318 interface with spatial data services 210.

Foundation 170 is multi-threaded, non-blocking, and memory efficient. Communication with browsers requires conversion to and from web assembly, while an engine may require a C Sharp ("C#") wrapper. These wrappers then communicate with the CHS system 200 through C++ interfaces and handle the transfer of data between the client and service as efficiently as possible. This library-wrapper combination acts like a contract that allows users from two different application clients to exist and interact in the same virtual space.

Foundation 170 also takes on the responsibility of converting between types when there is a mismatch between languages. To achieve this, integrated development environment project generation triggers a C++ reflection of the current set of APIs. This reflection scans through all of the endpoints of the CHS system 200 and data transfer objects and creates C++ code that matches exactly, so all of those compile types are available at runtime. Once this reflection is established, foundation 170 has all of the necessary code to communicate with CHS system 200. In other embodiments, this can be done in any code language, including without limitation code languages such as python, Swift, Kotlin, Java, C#, C++, and WebAssembly.

Then a developer maps foundation 170 interface to the corresponding service classes. This enables extremely fast iteration of CHS system 200.

Figure 4:
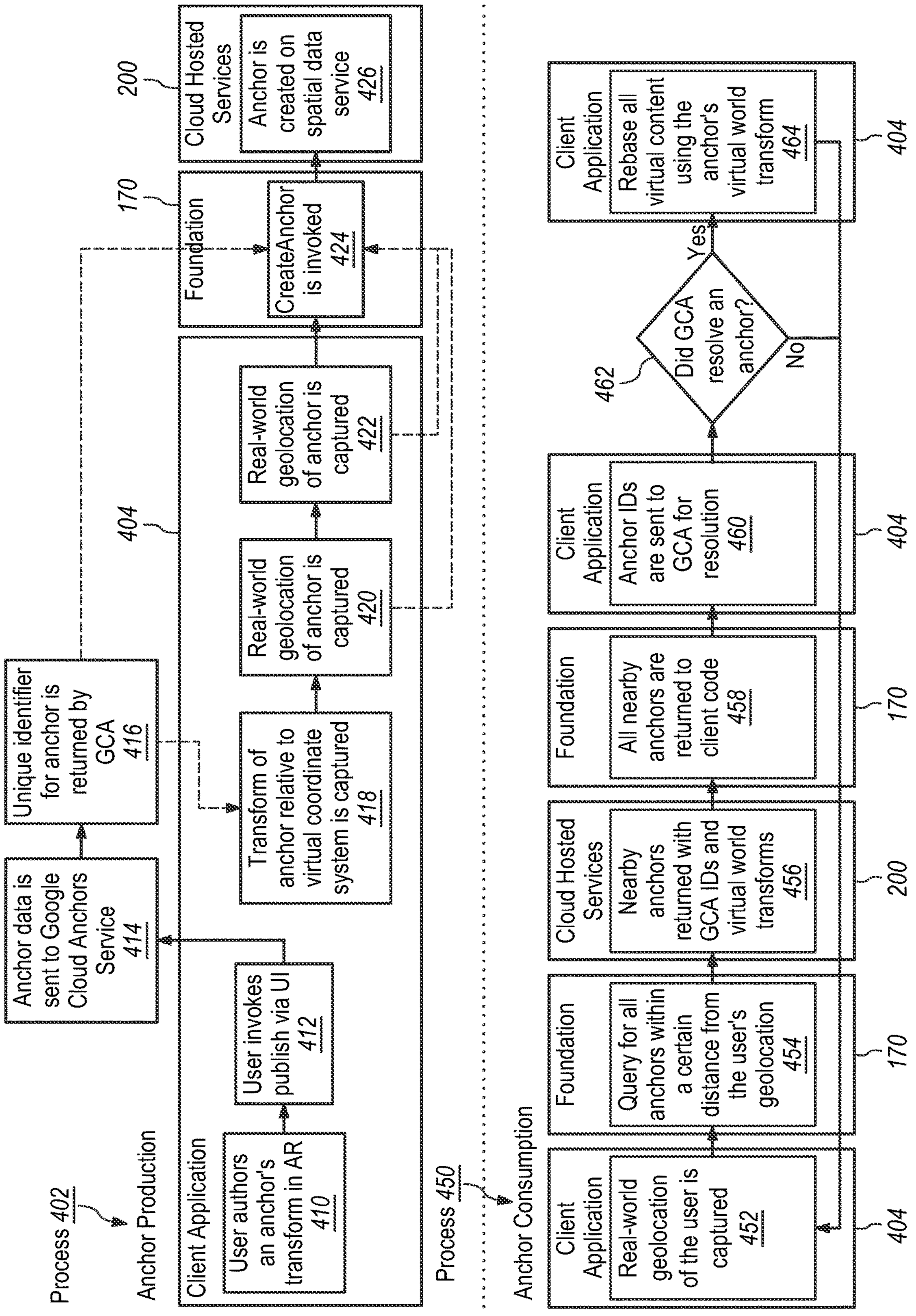
FIG. 4 shows an embodiment of a flow diagram for an anchor production process and an anchor consumption process.

Turning to FIG. 4, anchor production process 402 and anchor consumption process 450 are shown. For anchor production process 402, the process starts inside client application 404 at step 410 where the user authors an anchor transform in augmented reality. Next, at step 412, the user invokes a "publish" routine via a user interface, which causes an upload of the data necessary to recognize the anchor 344 when encountered in an application by an end user as well as the localization data. The localization data can comprise digital coordinate space orientation and location of the anchor 344, geographic information, and any other data necessary to position the user.

Then, at step 414, anchor production process 402 moves outside of the client application 404, and anchor data is sent to a cloud anchor service, such as Google Cloud Anchors ("GCA") Service. Next, at step 416, a unique identifier for the anchor 344 is returned by the cloud anchor service. The process then moves back inside of client application 404, and at step 418 the transform of the anchor 344 relative to the virtual coordinate system is captured. At steps 420 and 422, the real-world geolocation of the anchor 344 is captured. Anchor production process 402 then moves to foundation 170 where at step 424 the create anchor function is invoked. The anchor production process 402 then moves to CHS system 200 where the cloud anchor 376 is created from anchor 344 and the captured data via spatial data service 210 at step 426.

For anchor consumption process 450, the process starts in client application 404 where at step 452 the real-world geolocation of the user is captured. Anchor consumption process 450 then moves to foundation 170 where at step 454 there is a query for all anchors 344 within a certain distance from the user's geolocation. Anchor consumption process 450 then moves to CHS system 200 where at step 456 nearby cloud anchors 376 are returned with GCA IDs and the virtual world transforms. The anchor consumption process 450 then moves back to foundation 170 where at step 458 all nearby cloud anchors 376 are returned to client code, meaning the data that is "published" is returned to the client, that is, data necessary to recover the anchor 344 and the associated localization data.

Anchor consumption process 450 then moves back to client application 404 where at step 460 the anchor IDs are sent to the GCA for resolution. Next, at step 462, there is a query as to whether the GCA resolved an anchor 344. If not, the anchor consumption process 450 moves back to step 452 and anchor consumption process 450 repeats. If yes, the anchor consumption process 450 moves to step 464 where these is a rebase of all virtual content using the anchor's 344 virtual world transform. A rebase is when all the virtual content's world space locations are adjusted to account for the anchor's 344 newly resolved virtual world transform.

EXAMPLE APPLICATIONS

Connected spaces combined with the physical world provide advantages in a number of applications, such as for design and planning teams, operations, and visitors.

Design and planning teams can collaborate in the physical space that is to be augmented with digital content using the with the assets they have already create for a better representation of the finished experience. They can share work between different teams, so the teams stay synchronized. They can review and approve work in context with stakeholders, so there are no surprises.

Before a new operation goes live, simulations can be run to identify operational issues and confirm readiness. If there are data or devices in the environment, it is possible to monitor them in context for faster and better understanding. If live users are trackable through devices or cameras, meaningful analytics can be visualized to help deliver the best experience. The POI system 180 allows pushing content in context to people's mobile devices relevant to events happening around them.

Connected spaces combined with the physical world also give visitors a better experience and access to richer content, in context, through mobile phones and other devices Connected spaces combined with users of mobile AR and mixed reality provide advantages in a number of applications, such as for design and planning teams, operations, and visitors.

Design and planning teams can walk the space while it is in progress and see what is coming. They can create narrative journeys, such as tour guides, that can satisfy visitors' interests. They can Review digital content in context. They can review and approve work in context with stakeholders.

Before a new operation goes live, the team can get an "Iron Man" or mission control view of the relevant systems and data in the context of the space. The POI system 180 also allows the team to maintain situational awareness for live operations.

Connected spaces combined with users of mobile AR and mixed reality also give visitors access to interactive digital content in context to the physical content personalized to the specific visitors. The POI system 180 in concert with the VPS 120 allows visitors to know where they are and where they want to go with better wayfinding. The POI system 180 in concert with the VPS 120 also allow visitors to keep track of friends and family.

Connected spaces combined with users of VR or remote users on desktop or mobile devices provide advantages in a number of applications, such as for design and planning teams, operations, and visitors, particularly when access to the physical space is prohibitive or impractical.

Design and planning teams can access all the features of mixed reality and regular reality but with superpowers. The lack of constraints from the laws of physics that define purely digital activations unleashes an additional degree of creative freedom and simulation that is not tied to the limitations of a physical environment.

Before a new operation goes live, it is possible to publish and monetize a space to access a remote audience. Connected spaces combined with users of VR or remote users on desktop or mobile devices allow for more space, virtually, for content than the actual physical site offers. Spaces can also be archived so they can live on after the physical space is gone. The team can also manage the live space, see the users, and ensure they are receiving the best experience.

Visitors can access the places and people they want to visit from across the world. POI system 180 enables remote workforces, reduces travel and conference costs, and provides a unified experience across the physical and digital content.

Connected spaces have the advantage of bringing people around the world together. On-site and off-site users can see each other and share a common experience across all consumer devices.

Specifically, on-site physical users can view and interact with a digital layer matched to the physical world through AR. They can have context from positioning and awareness of the content available around them even through traditional interfaces. They have the ability to "replay" their experience, including content they did not engage with, but were proximate to.

Off-site digital users can view and interact with the same digital content over the digital twin such as through desktops, mobile devices, or VR. Off-site digital users can experience superpowers, such as flight. They can jump into video streams, including experiencing a 360°, of the physical site to get a more realistic view.

All users can view and interact with other users and content, regardless of platform, to the best of their device and network capabilities.

Numerous applications exist for connected spaces and Platform 100, and methods for creating them. For example, Platform 100 allows companies to create, update, and manage a virtual online presence their consumers can engage in. Physical spaces can be connected with other physical spaces. Platform 100 can connect physical spaces, such as malls, office buildings, entertainment centers, and museums that are full of digital content and smart devices, allowing management of the digital layer for the physical spaces.

Users can collaborate across the lifecycle of a space. Unlike simple videoconferencing, Platform 100 puts everyone in the same location, regardless of the device, and gives them the ability to work together in real time.

Connected spaces can be used for smart buildings and cities. Buildings and public infrastructure are becoming more data rich. Platform 100 offers the ability to make use of that information by empowering the physical and virtual occupants during design, construction, and beyond.

For media and entertainment, connected spaces can create immersive experiences. They can create better films and television programs by building worlds and capturing the story with traditional interfaces. They allow exploring ideas faster with fewer people to ensure the presentation of the best creative result on opening weekend, before the creation of video effects ("VFX"). Connected spaces make movies agile. Platform 100 provides the ability to see the project early and often when changes are easy and inexpensive. It can provide clarity on costs and outcomes before tough decisions have to be made, and it takes the risks out of the unknown.

Platform 100 allows connecting with the audience in new ways, such as making the brand's content personal, interactive, and engaging by giving the audience a role to play in the next generation of media and taking stories beyond theaters and screens, while benefiting the creation of that media on the way.

Platform 100 can simplify the complexity. As media becomes more digital, the complexity immobilizes everyone and sacrifices creativity and quality as costs run-up. Platform 100 overcomes this by putting people around the globe, 24 hours a day, 7 days a week (24/7), on the same page and looking at the same movie.

For live events, conferences, and location-based entertainment venues, the user experience can be customized with dynamic content that designers can refresh and update as needed.

Designing and planning can be done in context. Designers and planners can create narratives, trigger events, and manage entertainment plans across the site. They can explore ideas freely as a team while early in production so they can build and present the best experience on opening day.

Event-management mission control is possible by allowing visualization of connected systems. The APIs of existing systems can be connected for monitoring guest activity and operations in context. The large amount of information can be made actionable.

Connected spaces will allow for better connections with the audiences by making the guest experience personal and engaging by using guest analytics in real-time. It can provide a digital layer for the guests to engage with on their personal devices and make the event respond better to their interests.

Connected spaces allow one or more people to share their experiences with the world. By consolidating digital content in a format that supports next-gen viewing devices, off-site engagement can be taken to new levels, drive more traffic to a physical location, and monetize it.

For retail centers, museums, and public spaces, users want and expect a digital layer. Platform 100 connects occupants of spaces to the opportunities around them in ways that give the operators visibility and enables the spaces to be customized to the occupants. It is possible to create narratives, trigger events, manage entertainment plans across the site. A digital layer can be created for guests to engage with on their mobile phones and devices to optimize traffic and make the space respond better to their needs.

Retail infrastructure can be managed from the inside. By connecting APIs to existing systems, guest activity and operations can be monitored in context and information can be made actionable.

Retail tenants can be offered a platform to connect with guests in the space. Data is a new type of utility like water and power. By sharing valuable guest analytics with tenants, it will allow tenants to make the guest experience personal and engaging and to help tenants succeed.

As digital content is consolidated, digital content in a format that supports next-gen viewing devices, off-site engagement can be driven to new levels and more traffic can be driven to a physical retail location instead of online retail.

Future exhibits can be designed from within for museums and science centers.

Platform 100 makes it possible for all teams to work on the same page and to try out ideas before opening day. When the exhibits are launched, they will engage a younger audience with interactivity the way they are used to interacting with data.

Visitor experiences at museums or science centers can be better understood and managed. Platform 100 can monitor what is popular and what is not. Then attention can be directed where it is needed, pinch points identified, and flow can be adjusted in real-time to accommodate linger areas.

Existing museum and science center exhibits can be captured and made accessible to remote visitors around the world. Platform 100 makes it possible to preserve exhibits, localize them, and share them with a global audience without the costs of them traveling while controlling access and monetizing them.

Connected spaces can solve the problem of limited space for a museum or science center because immersive content has no walls and can grow to suit content needs. The experience for physical visitors on the site can be as personal as for remote visitors.

A common operational picture can exist for government spaces and use cases.

Systems can be integrated via APIs to create a common interface that is accessible across platforms and teams. Physical assets and sites can be connected through digital twinning so everyone is cognitively aligned in real-time.

Platform 100 and connected spaces can provide an environment for master planning and training for government spaces by using digital twins and multi-user collaboration to develop, test, and train assets through scenarios before taking them to the real world. Immersive training for the team is significantly more effective at preparing them for the real world.

Platform 100 and connected spaces can provide situational awareness related to government spaces. Platform 100 makes it possible for all teams to see the same information and collaborate with context. The team becomes far greater than the sum of the individuals when the world is an information-rich environment that is easily accessible and digestible.

Platform 100 and connected spaces can provide command and control of government spaces. They allow monitoring real-time events, coordinating assets on the ground, and running simulations in real-time in a simple contextual interface that resembles reality. Information and capabilities can be moved up and down the chain of command with levels of detail that match the context.

Platform 100 can work with smart cities. As urban infrastructure comes online and more connected spaces and buildings are built, the occupants expect an accessible layer of information in context for practical applications.

Platform 100 and connected spaces can be used for master planning for cities and buildings. They allow for a live mission control overview of city events and monitoring data in context via APIs, instead of looking through different systems for pieces of information. Also, future and past events can be visualized in different layers to provide the overall context needed to enable city agents to arrive at the best decision.

Platform 100 and connected spaces can be used for civil and business operations for cities and buildings. For example, they can provide situational awareness for coordinated emergency response efforts, monitor data or devices in the environment in context for faster, better understanding, provide the ability to see teams on-site and what critical information they're streaming, and push content in context to the team's mobile devices relevant to the things happening around them.

Platform 100 and connected spaces can also be used for resident and occupant services for cities and buildings by providing a better experience of what the city has to offer, providing way-finding and navigation, and providing access to richer content in context through mobile phones.

While the invention has been specifically described in connection with certain specific embodiments thereof, it is to be understood that this is by way of illustration and not of limitation. Reasonable variations and modifications are possible within the scope of the foregoing disclosure and drawings without departing from the spirit of the invention.

What is claimed is:

1. A method for converting between a plurality of code types for a client application wherein there is a mismatch between one or more of the plurality of code types comprising:

triggering a reflection of a current set of application programming interfaces (APIs);

scanning through a plurality of endpoints of cloud-hosted services and data transfer objects;

creating a matching code at compile time for the client application to provide at runtime, wherein creating the matching code comprises generating at least one bi-directional wrapper to translate between a cross-platform library and at least one target language of a plurality of target languages of disparate platforms; and communicating with the cloud-hosted services.

2. The method of claim 1 wherein converting between a plurality of code types provides platform independent interoperability.

3. The method of claim 1 wherein the reflection is a C++ reflection.

4. The method of claim 3 wherein the matching code is C++ code.

5. The method of claim 1 wherein the reflection is a C# reflection.

6. The method of claim 5 wherein the matching code is C# code.

7. The method of claim 1 wherein the reflection is a WebAssembly reflection.

8. The method of claim 7 wherein the matching code is WebAssembly code.

9. The method of claim 1 wherein the reflection is a python reflection.

10. The method of claim 9 wherein the matching code is python code.

11. The method of claim 1 wherein the reflection is a Swift reflection.

12. The method of claim 11 wherein the matching code is Swift code.

13. The method of claim 1 wherein the reflection is a Kotlin reflection.

14. The method of claim 13 wherein the matching code is Kotlin code.

15. The method of claim 1 wherein the reflection is a Java reflection.

16. The method of claim 15 wherein the matching code is Java code.

* * * * *